Figure 1:
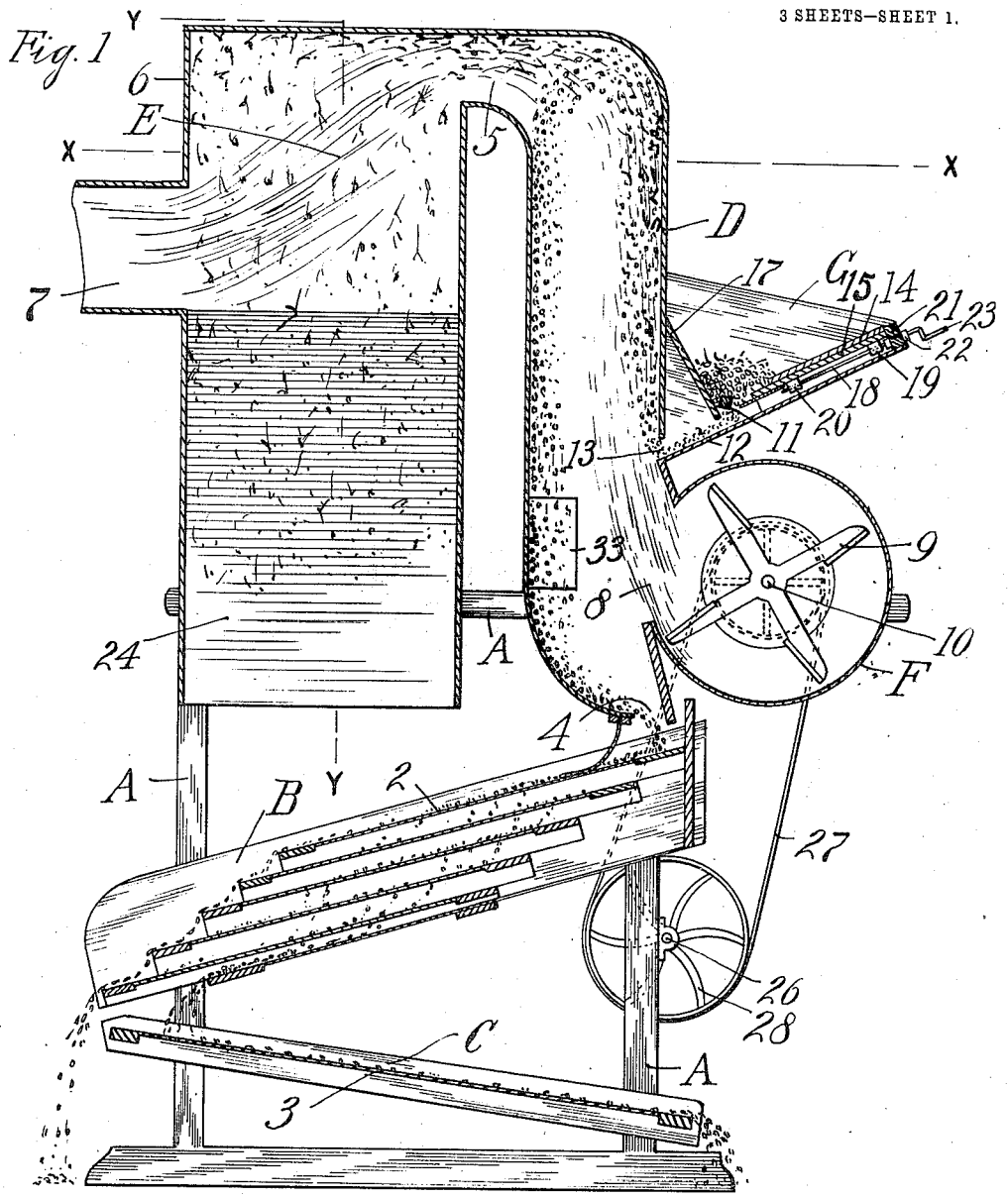

T. O. HELGERSON.
GRAIN CLEANER.
APPLICATION FILED SEPT. 29, 1908.

1,019,470.

Patented Mar. 5, 1912.

3 SHEETS—SHEET 1.

Witnesses,
George Voelker

Inventor,
Thomas O. Helgerson
by Lothrop & Johnson
his Attorneys.

T. O. HELGERSON.
GRAIN CLEANER.
APPLICATION FILED SEPT. 29, 1908.
1,019,470.
Patented Mar. 5, 1912.
3 SHEETS—SHEET 2.
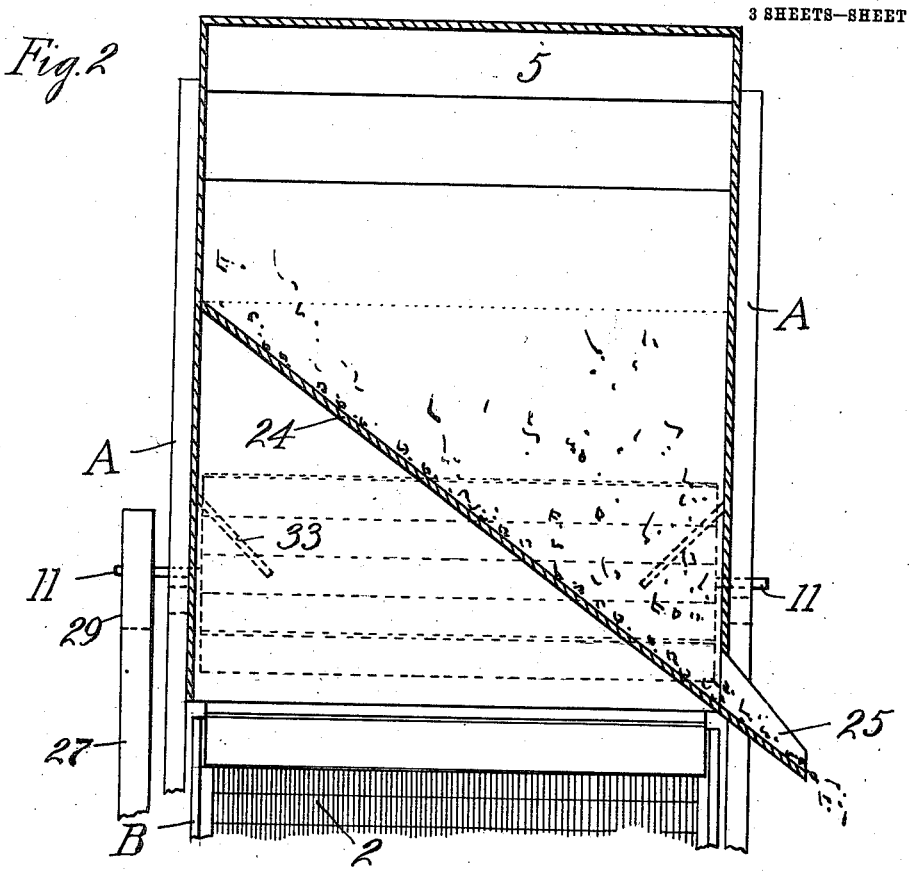
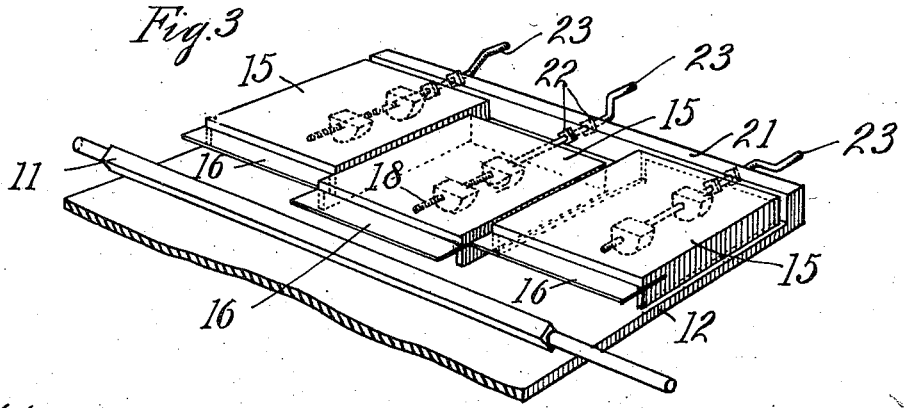
Witnesses,
George Voelker
Inventor,
Thomas O. Helgerson
by Lothrop & Johnson
his Attorneys.

T. O. HELGERSON.
GRAIN CLEANER.
APPLICATION FILED SEPT. 29, 1908.
1,019,470.
Patented Mar. 5, 1912.
3 SHEETS—SHEET 3.
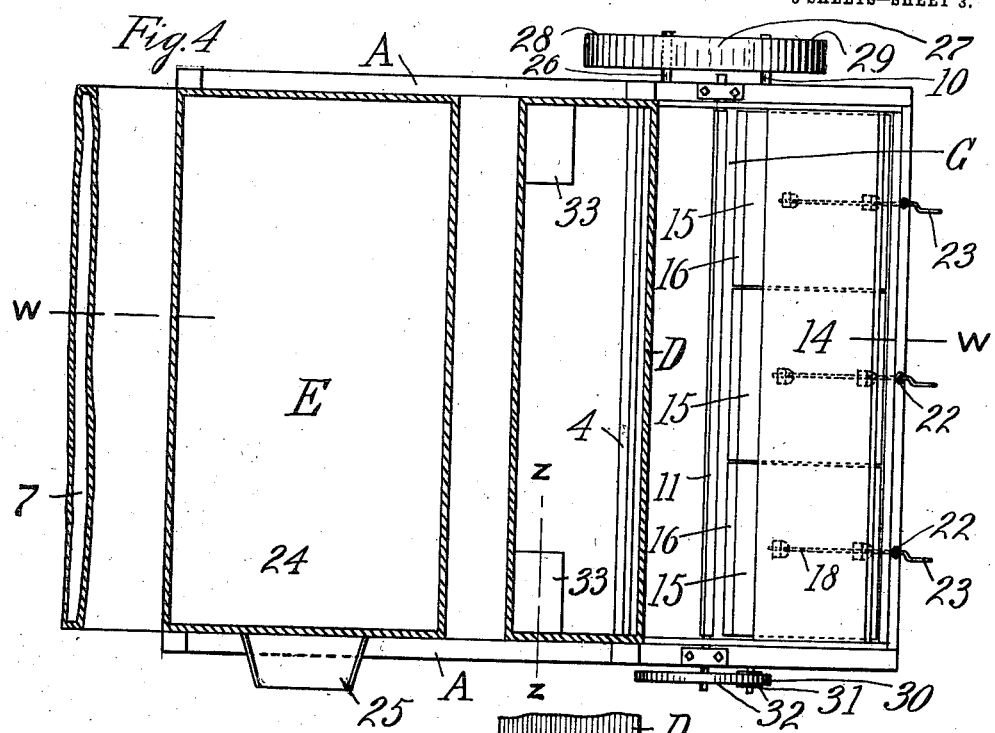
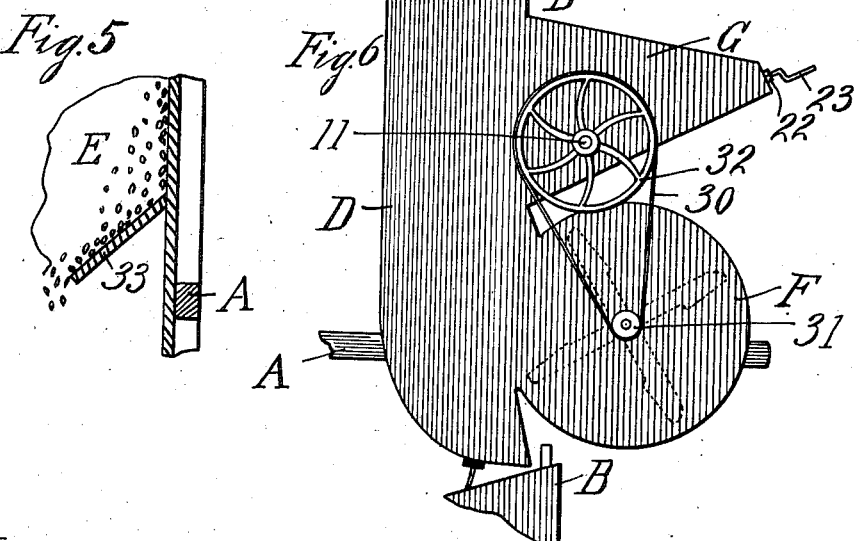
Witnesses,
George Voelker
Inventor,
Thomas O. Helgerson
by Lothrop & Johnson
his Attorneys.

UNITED STATES PATENT OFFICE.

THOMAS O. HELGERSON, OF MINNEAPOLIS, MINNESOTA, ASSIGNOR OF ONE-HALF TO FOSSTON MANUFACTURING COMPANY, OF ST. PAUL, MINNESOTA, A CORPORATION OF MINNESOTA.

GRAIN-CLEANER.

1,019,470.  Specification of Letters Patent.  Patented Mar. 5, 1912.

Application filed September 29, 1908. Serial No. 455,258.

*To all whom it may concern:*

Be it known that I, THOMAS O. HELGERSON, a citizen of the United States, residing at Minneapolis, in the county of Hennepin and State of Minnesota, have invented certain new and useful Improvements in Grain-Cleaners, of which the following is a specification.

My invention relates to improvements in grain cleaners, its objects being to provide pneumatic means for removing the lighter material, such as dust, fine dirt, chaff, small pin oats and fine seed, from the grain before it reaches the scalping screens, and to provide improved means for feeding and regulating the supply of grain from the hopper to the cleaning apparatus.

With these objects in views I have devised a grain cleaner wherein the grain to be cleaned is fed into a wind trunk in the path of a current of air, which carries off the lighter material and allows the grain to fall upon the scalping screens.

More particularly the invention consists in the construction, combination, and arrangement of parts hereinafter described and claimed.

In the accompanying drawings forming part of this specification, Figure 1 is a vertical longitudinal section through the middle of a grain cleaner embodying the invention taken on line $w$—$w$ of Fig. 4, with the air outlet flue partly broken away; Fig. 2 is a vertical section on line $y$—$y$ of Fig. 1; Fig. 3 is a perspective view of the feed regulating devices and a fragment of the hopper bottom; Fig. 4 is a horizontal section on line $x$—$x$ of Fig. 1; Fig. 5 is a vertical section of a fragment of the wind trunk on line $z$—$z$ of Fig. 4, and Fig. 6 is a side view of a fragment of the frame, showing the fan casing, hopper and part of the wind trunk.

In the drawings A represents the frame of the machine, B the upper shoe, wherein is arranged the usual gang of scalping screens 2, and C the lower shoe in which is supported a screen 3. The construction and operation of these screens, which are designed to be shaken by suitable mechanism (not shown), are so well known in the art that further description is unnecessary.

Supported upon the frame above the scalping screens is an upwardly extending wind trunk D, having at the bottom an outlet opening 4, extending from one side of the wind trunk to the other, through which the grain drops upon the scalping screens as hereinafter explained. To secure the best results the wind trunk is carried up vertically for some distance. At the top it terminates in an elbow or neck 5 which turns sharply to the rear and enters the front wall of a settling chamber E. The rear wall of the settling chamber is made with a vertical portion 6 opposite the discharge end of the neck to form a baffle plate for the air and material coming from the wind trunk, while at a point below the discharge end of the neck it is made with a rearwardly extending discharge flue 7 to permit the escape of the air blast and the dust and light refuse carried with it. The flue, of course, extends from one side of the chamber to the other.

Supported upon the frame A near the bottom of the wind trunk is a blower having a casing F which extends across the front wall of the wind trunk. The blower chamber communicates with the interior of the wind trunk through a common opening 8 in the side of the casing and the front wall of the wind trunk. Rotatable within the casing is a fan 9, the shaft 10 of which has journal support upon the frame A. The opening 8 in the fan casing is positioned at the side of the casing well above the bottom in order to direct the air blast up along the inner side of the front wall of the wind trunk.

Arranged across the front wall of the wind trunk just above the blower is a hopper G having at the bottom a feed opening in which is arranged a squared shaft 11 rotatably supported upon the frame at the ends of the hopper. Beneath the hopper is a feed pan 12 which receives the grain from the hopper. The feed pan leads downwardly to an opening 13 in the front wall of the wind trunk, through which the grain enters the trunk.

Slidably arranged upon the underside of the downwardly inclined hopper bottom 14 are three sliding sections or slides 15 having at their lower ends valve plates 16 adapted, when the slides are moved down far enough, to pass under the squared shaft 11 and abut against the back board 17, and thus cut off the supply of grain. The slides extend side by side entirely across the hopper. Each slide is operated independently of the others by suitable means, such as the screw 18, which is slidably supported in a lug 19, and has threaded engagement with a lug 20, upon the underside of the slide, as shown in the drawings. As there shown the screw is rotatably supported in the cross bar 21 of the hopper frame and is held from the longitudinal movement by means of lugs or nuts 22 on opposite sides of the bar. The screws have operating handles 23. Within the chamber E below the discharge flue 7 is a downwardly inclined bottom or chute 24 extending entirely across the chamber and leading down to a spout 25 at the side of chamber, whereby such of the lighter refuse as has not been blown out of the flue 7 is spouted out of the side of the machine.

The fan shaft 10 is driven from the drive shaft 26 by means of the belt 27 which passes over the pulleys 28 and 29 upon the drive shaft and fan shaft, respectively; and the feed shaft 11 is driven from the fan shaft by means of the belt 30 which passes over the pulleys 31 and 32 upon the fan shaft and feed shaft, respectively.

In practice the grain to be cleaned is put into the hopper and the slides 15 are adjusted so as to leave an opening of the desired size between them and the back hopper board 17. The grain will pass down through this opening to the feed pan and thence through the opening 13 into the wind trunk, being kept in motion by the squared shaft 11, the rotation of which insures a steady flow of the grain and prevents clogging of the feed opening. As the sliding sections 15 are independent of each other, they may be set at different positions so that the falling grain will be evenly distributed across the entire width of the wind trunk. By reason of the position of the opening in the fan casing the blast of air from the fan will be driven up along the inner side of the front wall of the wind trunk, so that the grain from the hopper will be discharged directly into the air current, and be carried up with it. The amount of the blast can, of course, be regulated by the speed of operation of the fan, so as to secure the right amount for the grain which is to be cleaned. Sufficient blast is used to carry the grain directly up, the heavier grain being carried only a short distance while the lighter is carried to the top of the wind trunk. As the blast loses part of its force the good grain drops back into the back part of the wind trunk where the air is slack, while everything of a lighter nature, such as dust, fine dirt, chaff, small pin oats, and fine seed is carried over with the blast into the chamber E, where the dust and chaff are carried out of the discharge flue 7 with the air blast, while everything else settles down onto the partition or chute 24 and passes out through the spout 25, making practically a dustless machine. The good grain, with everything which has not been carried over into the chamber E, falls down the slack air part of the wind trunk through the opening 4 on to the scalping screens where everything larger than the grain to be saved is scalped off, while the rest passes down on to the lower screen 3 where everything finer than the grain to be saved is sifted out. In order to direct the falling grain toward the middle portion of the wind trunk, a short downwardly and inwardly inclined plate 33 is secured upon the inner side of each of the side walls, of the trunk, in the rear or slack air portion thereof, in position to intercept and deflect the falling grain.

It is to be observed that the air blast as it enters the chamber E will be blown against the opposite wall portion or baffle 6 and be broken in its course, thereby permitting the heavier material carried with it to drop upon the bottom chute 24 instead of being carried out with the air blast. Thus, by the present improved process I remove from the grain before it reaches the scalping screens all the stuff which so often obstructs and clogs the scalping screens, thereby increasing the capacity of the scalper, and causing the grain to go through faster and come out cleaner. The machine is also practically dustless as the dust and dirt are lifted out and carried off before the grain reaches the screens.

It is obvious that modifications may be made in the details of the device without departing from the principle of the invention the scope of which is defined in the claim.

I claim as my invention:

In a grain cleaner, the combination, with the screens, of a refuse chamber and a wind trunk arranged side by side, the wind trunk extending upwardly from the screens and terminating in an elbow leading into the refuse chamber, and the refuse chamber having on the opposite side a baffle wall opposed to the elbow outlet and a discharge flue positioned lower down than the elbow, an inclined chute extending across the chamber and leading to the bottom thereof for the discharge of refuse, a blower in position to send an air blast up through the wind trunk, and means for supplying grain to the wind trunk above the blower, the wind trunk having a grain outlet above the screens.

In testimony whereof I affix my signature in presence of two witnesses.

THOMAS O. HELGERSON.

Witnesses:
ARTHUR P. LOTHROP,
HATTIE SMITH.